United States Patent [19]

Berleyev

[11] Patent Number: 5,124,012

[45] Date of Patent: Jun. 23, 1992

[54] PROCESS FOR THE DESALINATION OF SEA AND FOR OBTAINING ENERGY AND THE RAW MATERIALS CONTAINED IN SEA WATER

[75] Inventor: Friedhelm Vomberg, Solingen, Fed. Rep. of Germany

[73] Assignee: Grigori Berleyev, Benyi Brack, Israel Germany

[21] Appl. No.: 532,259

[22] Filed: Jun. 1, 1990

[51] Int. Cl.⁵ ............................................. C25B 7/00
[52] U.S. Cl. ................................. 204/180.1; 204/186
[58] Field of Search ................ 204/186, 180.1, 299 R

[56] References Cited

U.S. PATENT DOCUMENTS 3,236,759  2/1966  Litt ............................ 204/180.1 X
4,008,135  2/1977  Gazda ............................ 204/186 X Primary Examiner—Donald R. Valentine
Attorney, Agent, or Firm—Herbert Dubno

[57] ABSTRACT

Process and device for the desalination of sea water and obtaining energy and the raw materials contained in sea water.

This invention is based on the principle of separating the ions contained in sea water using an electrostatic field into two separate solutions, each with ions of a given polarity, and conveying these to a conductor on which they are neutralized. The neutralized atoms are then further processed chemically to obtain hydrogen, alkaline lyes, earth alkaline lyes, earth alkaline metals and halogens.

31 Claims, 2 Drawing Sheets

PROCESS FOR THE DESALINATION OF SEA AND FOR OBTAINING ENERGY AND THE RAW MATERIALS CONTAINED IN SEA WATER

FIELD OF THE INVENTION

The invention relates to a process and a device for the desalination of sea water and for obtaining energy and the raw materials contained in sea water.

BACKGROUND OF THE INVENTION

According to the prior art there are three basic methods for the desalination of sea water:
1. obtaining water by changing its state, i.e. by evaporation or crystallisation;
2. desalination by electrolytic processes; and
3. reverse osmosis.

The evaporation and distillation of water, for example, requires an energy input of approximately 25 to 30 kWh/m$^3$ water and hence involves a high energy input, with the heat supplied being at least largely lost in the process. Distillation plants also have the disadvantage that they are exposed to a high risk of corrosion, making it necessary to replace the surfaces coming into contact with the sea water after 1½ to 2 years. The productivity of these distillaiton plants is restricted to a maximum of 1000 m$^3$ per day.

The freezing process is based on the formation and growth of individual crystals on which only chemically homogeneous substances agglomerate, whereas foreign particles find no place in the lattice. The formation of inter-crystalline zones in which foreign particles can settle takes place in aqueous solutions when approximately 50% of the salt solution has changed into the solid state. The refrigeration units required for freezing in this way also operate at a low efficiency, and yet are very complex in terms of process technology. In any event, in practice the options described are relatively costly.

In the case of electrodialysis the ions are extracted directly from the salt solution; the ions give up their charge and the metal atmos formed in this way settle on the cathode. This process is in principle applicable only for weak solutions, but not for the desalination of sea water, since the ion concentration is 10$^5$ per liter of solution. Attempts to reduce the ion concentration by using ion filters are unsuitable since these filters become unusable after a short time because of the ions deposited there. The problem of corrosion is also prominent in the case of electrolytic processes.

Niether has the so-called reverse osmosis process been technically successful, since the water quantities produced in the largest experimental plants barely exceeds 1000 liters per day. In reverse osmosis the salt solution is pressed through cellulose acetate membranes at pressures of 50 bar, or sometimes up to 100 bar. The mechanical stress on the membranes is correspondingly high. A disadvantage of this desalination method is that the membranes become unusable after a long period of use for various reasons, e.g. bacterial attack. Reverse osmosis admittedly has the advantage over the previously described methods that only small quantities of energy are used, by this cannot outweigh the disadvantages of low productivity and the danger of damage to the membranes.

Furthermore, the problems of energy supply in the future can by no means be regarded as solved. The combustion of fossil fuels produces carbon dioxide, of which the increasing proportions in the atmosphere bring the danger of very serious climatic consequences. The obtaining of energy by nuclear fission has created problems concerning the elimination of the radioactive waste. Obtaining energy from solar sources or by wind power devices admittedly has the advantage of producing no waste, but has to be regarded as a failure in economic terms.

Hence there is still an urgent need for the creation of new sources of energy which can be used economically and without pollution of the environment.

OBJECT OF THE INVENTION

It is therefore the object of the present invention to provide improved energy sources, and to provide a process and a device for the desalination of sea water which can operate in an economic manner without environmental pollution.

SUMMARY OF THE INVENTION

This object is achieved according to the invention in a process for the desalination of sea water and for obtaining energy and the raw materials contained in sea water, in which the sea water is passed through an electrostatic field lying transverse to its direction of flow, and in addition to an ion-low sea water current, sea water currents enriched in anions and cations respectively are drawn off.

The sea water in a first stage is drawn from below into a chamber which is fitted with essentially vertically planar electrodes coated with a dielectric in such a way that the ions are deflected towards the electrodes by the electrostatic field between the electrodes, but are entrained by the current flow directed into the drawing-off lines and supported by gravitation before they reach the electrodes. The de-ionized part of the water is drawn off above the electrodes. In a further stage the aqueous ion flows drawn off are conveyed past conductors, discharged there are conveyed into a separation stage. On the one hand this objective is attained through the process.

The fundamental idea of this process is based, in contrast with the prior art, on the fact that the ions dissociated in sea water are extracted from the water without any significant input of energy and their energy and also their raw material contents can be utilized. The energy required for this purpose can be reduced to the amount required for pumping the water up. The pumping upwards of one cubic meter of water requires only 0.003 kWh, and the remaining amount of energy required to maintain the electrostatic field is 1000 times less, and is hence negligible. However, the process according to the invention results in the release of 55 kWh, which is bound in the salt water at an assumed level of 35 kg salt/m$^3$. Assuming $3 \times 10^{26}$ pairs of ions, i.e. $6 \times 10$ ions/m$^3$, the charge is approximately 10$^8$ coulomb, which corresponds to an energy content through coulomb force of $2.6 \times 10^{-21}$ joules. The kinetic energy of the ions, ion contrast, at $5.8 \times 10^{-21}$, is almost three times greater, so that by utilizing the high degree of movement of the ions, ion separation without neutralization can be achieved. The 55 kWh referred to above is based on molecule energy of $7 \times 10^{-19}$ joules per pair, multiplied by the number of pairs ($3 \times 10^{26}$), i.e. $2.1 \times 10^8$ joules = 55 kWh.

Since the process according to the invention (and the device discussed later) also allow the desalination of large quantities of sea water, the preparation of from 1 to 5 million cubic meters of water per day is now possible, and any danger of corrosion can be avoided by the use of plastic as lining of the pipelines.

In addition, the process according to the invention allows, as well as sea water desalination and the obtaining of energy, the extraction of the raw materials bound in the sea water, essentially alkali metals and alkaline earth metals, hydrogen and chloride gas.

According to the basic concept of the invention, the oppositely poled ions are separated in an electrostatic field, using their kinetic energy, which exceeds the coulomb attraction, but are drawn off out of the electrostatic field by the pronounced suction effect of the water as it flows off, without being neutralised. The water currents, each containing only ions of one polarity, are then conveyed past conductors, where they are discharged. The charge withdrawn can be drawn off directly as direct current, direct current having the advantage that the loss of voltage, even with conveyance via extremely long lines, is markedly less than in the case of alternating current.

In place of the electrostatic field described, in an alternative form in the first stage one can also operate with a square wave voltage applied to the electrodes (capacitor plates).

The voltages applied are 200 kV to 500 kV in the case of direct current voltage, or in the case of square wave voltage between 5 and 20 kV, preferably between 7 kV and 10 kV, at a frequency of between 10 Hz and 2 kHz. A laboratory experiment used frequencies of between 10 and 30 Hz, but to obtain a high level of current 1 kHz to 2 kHz is suggested.

To prevent ions from accumulating at relatively low flow speeds in the area of the electrodes, which are preferably lined with an insulating material to prevent any discharge to the electrodes, it is proposed according to a further feature of the invention to interrupt the constant direct current voltage for a short time, i.e. with pulses <20 microsec, by opposite voltages of approximately the same magnitude. During these short-duration pulses any accumulated ions are repelled and entrained by the current flow in question, without any noticeable disturbance or obstruction of the separation action of the electrostatic direct current field.

Such repulsion pulses can also be envisaged where a square wave voltage is used; in this case the short-duration voltage pulses used are of 20 microsec maximum or up to a maximum of 1/20 of the square wave voltage pulse duration i.e. the duration of the positive voltage pulse.

In the first or single stage in which the ions are separated by means of electrode, obviously only partial separation of the ions present in the sea water is possible, representing at least approximately 20% of the sea water quantities used. The ion separation level depends essentially on what voltages are applied and upon the flow speeds with which the sea water is conveyed through the electrodes. If appropriate the sea water can also be recycled several times through the same separation stage.

Further separation stages can be connected following the the first separation stage.

In order to prevent a charge accumulation in the draw-off zone of the first stage, restricting the flow speed of the ion flows drawn off, the water/ion flows concerned are conveyed in grounded lines. The already de-ionized water quantities in the first stage can be drawn off separately from these flows, and represent around 20% of the water quantities used.

According to a further development of the process according to the invention the ion flows are conveyed on a non-grounded line partition parallel to each other at a distance from each other such that the coulomb attraction becomes effective, with the result that the oppositely poled ions re-concentrate at the facing edge zones of the lines; the more distant flow layers are deionised at the same time, so that by means of appropriate bifurcation the deionized water on the one hand and the smaller quantities of water with a high ion concentration on the other are conveyed separately. Preferably the conveyance in lines in this second stage is selected in such a way that 95 to 97% deionised water can be drawn off, so that after the second stage only approximately 2.4 to 4% of the original water quantity with a high ion concentration is conveyed to the conductors.

Preferably an electrostatic field which is as large as possible is developed in the first stage; this can be done by the application of a voltage of between 200 to 500 kV to the electrodes. The preferred flow speed of the separated ion flows is between 3 and 7 m/sec. As already discussed above, the flow of sea water or of the aqueous ion solution can be maintained by having the sea water pumped into a storage vessel, e.g. 8 to 10 m high, before the first stage, maintaining the flow or water or ions solely through the use of the previously produced potential energy. In other words, following the pumping up of the water, only gravitational force it used to maintain the flow. In this context it has been found useful for the technology of the process if the sea water in the first stage is conveyed from below into a chamber with essentially vertical planar electrodes, with the ions being drawn off by the electrostatic field between the electrodes towards the appropriate electrode in each case. Before the ions reach the electrodes they are, however, drawn off by the current flow directed into the drawing-off lines, by which means the separation of ions described above into two flows each containing ions of a given polarity (positive or negative) is achieved. The already deionized water is preferably drawn off above the electrodes. To ensure that the ions do not reach the electrodes and become neutralized there, the electrodes of the first stage are coated with a dielectric.

Whereas in a first stage the objective is to select a flow speed which is as high as possible in accordance with the electrostatic field, in the second stage it is preferable, in order to prevent long line conveyance at this point, to slow down the flow speed of the ions by increasing the cross-section of the line, say to 40 to 60% of the previous speed. This enables the coulomb force between the ions of opposite polarity, which are conveyed in separate lines, to act particularly effectively, with the repellant force between the charges of like polarity being overcome by the total coulomb force of the sum of all charge carriers.

To prevent disruption of the process by solids, organic living matter, plants, colloids, etc, sea water is mechanically filtered prior to being introduced into the first stage.

After discharge to the conductor the neutral metals which are present in high concentration in aqueous solution are conveyed into a reaction vessel where (volatile) hydrogen, metals (essentially alkali and alkaline earth metals) and chlorine gas are obtained. The hydrogen is produced according to the following chemical equations:

$$2Na + H_2O \rightarrow 2NaOH + H_2$$

$$2K + H_2O \rightarrow 2KOH + H_2$$

$$Mg + 2H_2O \rightarrow Mg(OH)_2 + H_2$$

$$Ca + 2H_2O \rightarrow Ca(OH)_2 + H_2$$

Assuming that the most frequent elements in sea water occur in appoximately the following quantities, the following amounts per cubic meter at 470 mol $H_2$ can be obtained in this way:

| | | |
|---|---|---|
| $Na^+$ | 38.5% | $3.5 \times 10^{26}$ |
| $K^+$ | 0.82% | $4.4 \times 10^{24}$ |
| $Mg^{++}$ | 8.95% | $7.7 \times 10^{25}$ |
| $Ca^{++}$ | 1.73% | $9.0 \times 10^{24}$ |

The above-mentioned chemical reactions proceed exothermically, so that the heat produced has to be drawn off and can be utilized. Any gaseous water particles in the collectable molecular hydrogen are separated by condensation to obtain pure hydrogen.

The lyes remaining in solution have different specific weights, which allows their separation into various fractions. Caustic soda and caustic potassium solution (NaOH and KOH) are immediately usable in industry.

Magnesium hydroxide and calcium hydroxide can be further processed independently of each other for the separation of magnesium and calcium respectively. This is performed by heating the lyes in question to metal oxides (MgO or CaO) and then passing hydrogen over the oxides according to the equations.

$$MgO + H_2 \rightarrow Mg + H_2O$$

$$CaO + H_2 \rightarrow Ca + H_2O$$

The separation of magnesium and calcium can preferably be carried out by making use of the different melting points. The melting point of magnesium is 651° C., whereas that of calcium is 881° C. At a temperature of approximately 700° C. the magnesium contained in the mixture melts and can be drawn off in liquid form, and similarly the calcium is melted by heating to 900° C. and also drawn off in liquid form.

A further usable element is the chlorine which is contained in large guantities in sea water. The chlorine can be conveyed following neutralization in the conductor stage into a reaction vessel, initially in dissolved form; in the reaction vessel it is gradually reacted, forming water and chlorine gas. The volatile chlorine gas can be collected and conveyed if appropriate for cleansing of evaporated water to a cooler. The purified chlorine gas is preferably cooled in a condenser to $-50°$ C. and compressed.

In this way it is possible to obtain, per cubic meter of water, approximately 224 mol chlorine gas, 24 kg alkaline metals, 3 kg magnesium and 0.6 kg calcium.

The process according to the invention is hence usable in an industrial-scale plant, such as on motor-propelled ships, which can use both the electrical energy and the hydrogen produced as energy reservoir and energy supplier. In this context the use of hydrogen, with an energy level almost three times as high as that of hydrocarbons, has the advantage that it burns without producing toxic materials.

The apparatus for carrying out the process of the invention comprises:

a) a storage tank, with at least one pump arranged in a feed line ending under the water level and a first flow-off line fitted with an adjustable or controllable valve emerging into a second vessel, b) a second vessel with an essentially vertically arranged pair of electrodes for the formation of an electrostatic field which is connected in the bottom of the container or in the area of the bottom of the container with the first flow-off line or lines, and which below the electrodes has two flow-off channels and above the electrodes has a further flow-off line (21), c) conductors behind the flow-off channels, and d) a chemical separation device for obtaining hydrogen, alkaline lyes, alkaline earth metals and chlorine gas.

The two flow-off channels are grounded.

The grounding of the flow-off channels, is interrupted on a partition and the flow-off channels in this area run parallel at a distance of between 2.5 and 3 m, and a further discharge line branches off from each flow-off channel in this area.

The flow-off channels can be at a minimum distance of 3 m from each other in front of and behind the partition. The flow-off channels can have a diameter of 8 to 12 cm in front of the partition, a widened diameter, preferably to 1.3 to 2 times the cross-section, in the partition, and behind the branching drawing-off lines a cross-section only 3 to 5% of this size.

The storage tank, the second storage tank, the electrodes, the flow-off channels and/or the flow-off pipes can be lined with plastic, preferably PVC.

The electrodes opposite each other can be formed as the walls of the second vessel and the vessel can have an essentially prismatic structure with the base facing downwards.

The electrodes in the lower area (flow-off area) can be bent outwards. In the upper area of the second vessel there is arranged a first flow-off line of at least 8 cm in diameter. The storage tank can have several filters and-/or slurry deposit basins. The separation device can consist of several reaction vessels, precipitation vessels and collection vessels.

Essential parts of this device are the first stage, already described above, in which ions of different polarity are separated from each other; this field is formed by a planar pair of electrodes to which voltages of between 200 and 500 kV are applied, with the electrodes preferably also forming two of the four walls of a prism-shaped vessel.

The introduction of sea water is carried out through a flow-off line from a storage tank which is preferably 8 to 10 m high, with the already de-ionized water (approximately 20%) being able to be drawn off above the electrodes and the water flows with differently-poled ions below the electrodes, into flow-off channels or lines. These flow-off channels lead to conductors in which discharge occurs, before hydrogen, alkaline lyes, alkaline earth metals and chlorine gas are obtained.

The two flow-off channels are preferably grounded as noted; according to a further feature of the invention the grounding of the flow-off channels is interrupted on a partition and the flow-off channels in this area rum parallel at a distance of between 2.5 and 3 m from each other. In this area a further drawn-off line for de-ionized water also branches off; the flow-off channels for the further conveyance of the still more concentrated ions in aqueous solution have a considerably smaller radius. Thus the flow-off channels before the partition have a diameter of 8 to 12 cm, they have a wider diameter in the partition, preferably increased to 1.3 to 2 times the cross-section, and after the branched-off flow-off line they have a cross-section of only 3 to 5% of this size. The distance between the flow-off channels before and after the said partition, in which further ion concentration takes place (second separation stage), is at least 3 m.

The storage tank has several filters and/or slurry deposit basins, so that the water pumped into the storage containers passes through several spirally arranged chambers or filters before being further conveyed into the second vessel (electrostatic field).

The separation device for obtaining the chemical substances contained in sea water consists of several reaction vessels, precipitation vessels and collection vessels, all known in the art.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
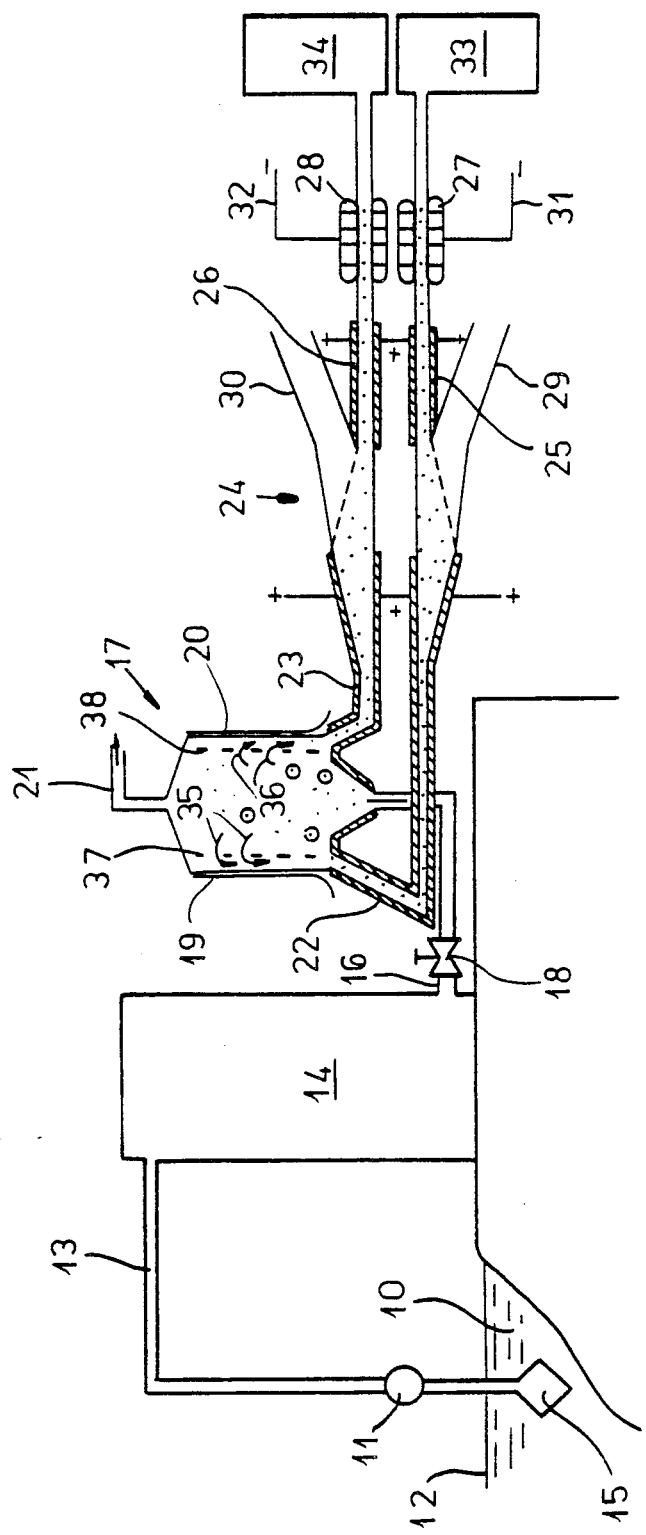
FIG. 1 is a diagrammatic representation of the plant according to the invention.

The sea water 10 is fed by means of one or more pumps 11 via a feed line 13 ending below the sea level 12 into a storage tank 14 (FIG. 1). For the separation in advance of solid bodies, plankton, algae and colloids etc a filter 15 is provided on the end of the feed line.

The storage tank 14 is approximately 8 to 10 m high and has sufficient capacity to provide water supply to the downstream parts of the plant even in the event of the failure of a pump 11 or if the filter 15 has to be cleaned for a short time. The pump 11 is also the only part of the plant which requires energy; after the water has been pumped up, the current flow is maintained by gravitational force alone from that point. From the storage tank 14 at least one flow-off line 16, with a regulation valve 18, leads to a second vessel 17. The flow-off line 16 emerges into this vessel 17 in its essentially rectangular or square bottom area.

The vessel 17 is also constructed in essentially prismatic form, with two of the four walls being formed as electrodes 19, 20, which are connected to appropriate control and supply systems. In the area of the top of the prism there is a flow-off line 21 for the removal of deionized water. Below the electrodes, whose lower ends are bent outwards, there are two flow-off channels 22, 23, with diameter of 10 cm. These flow-off channels 22, 23 are grounded and lead to a further second ion separation stage 24, in which the grounding of the flow-off channels is removed and the flow-off channels are brought closer together, from being a distance of 3 m apart to 0.5 m. In this second ion separation stage the flow-off channel diameter is increased in order to create a lesser flow speed. The flow speed is determined in such a way that the path length available $s_2$ is sufficient for the ions to accumulate through their coulomb attraction in the facing edge zones in each case of the flow-off channels and to be conveyed via flow-off channels 25, 26 of smaller diameter to conductors 27, 28. A short distance before the end of the second separation stage, lines 29, 30 for the ion-free water also branch off. The charges given off to the conductors 27, 28 are conveyed via lines 31, 32 in a manner known according to the prior art. The part of the flow-off channels 25, 26 behind the conductors 27, 28 emerges directly into a separation device 33, 34, in which not only hydrogen, but also alkaline and alkaline earth lyes, calcium, magnesium and chlorine are obtained.

The device according to the invention operates as follows:

The aqueous salt solution is conveyed into the storage tank 14 and from there into the second vessel 17, where it comes into the electrostatic field formed by the electrodes 19, 20. The electrodes 19, 20 are insulated by plastic coatings, so that there is no electrical contact with the aqueous solution. The voltage to the electrodes should be as high as possible, e.g. 500 kV. Once the electrical field has been set up, the energy loss can be regarded as relatively small, since the current flow from the electrodes should be 5 mA at the most. As the sea water in the second vessel 17 moves upwards the ions are separated in such a way that the negative ions migrate towards the anode 19 and the positive ions towards the cathode 20. The height of the electrodes 19, 20 is determined in terms of the quantity of water conveyed into the vessel 17 and its flow speed, in such a way that the water flowing out via the flow-off line 21 is deionized.

However, the electric field applied prevents the ions from flowing out via the flow-off line 21, but rather the ions are conveyed downwards in the direction of the arrows 35, 36 in connection with the water flow in that area, and are conveyed away via the flow-off channels 22, 23, probably with a flow speed of between 5 and 7 m/sec.

In the first stage, constituted by the electrostatic field of the electrodes 19, 20, the ions are hence merely deflected, but not neutralised. In the course of this deflection process they lose a portion of their kinetic energy, which at the same time constitutes a hindrance from their further movement towards the flow-off line 21. Rather they are entrained by the suction of the water flowing away in the flow-off channels 22, 23. If the suction of the water along the electrodes 19, 20 is not sufficient, if appropriate a broad-meshed lattice 37, 38 can be arranged before each electrode, which would create a flow channel above the flow-off channels 25, 26. This lattice would naturally be made of plastic. In order to prevent accumulation of charge in the flow-off channels 25, 26 which could as a result of the coulomb attraction of differently-poled ions, the flow-off channels 25, 26 are grounded up to the second separation stage 24. The earthing ends a short distance before the second separation stage, where the lines also run parallel close to each other, so that the coulomb attraction becomes effective. This attraction leads to the ions accumulating in the edge zones of the facing areas, so that the deionized water can be drawn off via flow-off channels 25, 26, whereas a portion of the aqueous solution with all the ions (2 to 5%) is further conveyed via the continued flow-off channels 25, 26. These flow-off channels are also grounded. The current discharge takes place to the conductors which form the wall areas of the flow-off channels 25, 26.

Only with the process described here is it possible to separate the individual ions, with each individual ion being separated by approximately 55 water molecules. The energy used in dissociation, of approximately $7 \times 10^{-19}$ joules per molecule, can ultimately be utilized. The voltage created at conductors 27, 28 is determined by the equation $U = g/C$, where q is the charge received on the conductor plates and C is its capacity.

After the ions, essentially $Na^+$, $K^+$, $Mg^{2+}$, $Ca^{2+}$, $Cl^-$, $Br^-$, and I, have lost their charge and have become chemically neutral atoms, they react with the water to form corresponding lyes with the simultaneous formation of molecular hydrogen. As can be seen from FIG. 2, this hydrogen is stored in hydrogen containers after having been drawn off and cleansed of water by condensation. The hydrogen can be used in the plant, for example as fuel. The remaining alkaline and alkaline earth lyes can be separated on the basis of their differing specific weights, and the alkaline lyes are immediately usable commercially. To obtain pure metals, the alkaline earth lyes are first heated, which produces water and the metal oxides concerned. The metal oxides are conveyed on into a further reaction chamber, where they are exposed to the action of a reducing hydrogen flame, with the reaction being maintained by constant withdrawal of water. The separation of the individual alkaline earth metals, particularly magnesium and calcium, takes place in a further stage by step-wise heating, first to a temperature above the melting point of magnesium (651° C.) but below the melting point of calcium (881° C.), so that the magnesium becomes liquid and can be drawn off. After heating to e.g. 900° C. the calcium becomes liquid and can be drawn off. The remaining residue is removed elsewhere. Metal rectification 40 is shown in FIG. 2.

Obtaining halogen will now be illustrated using the example of chlorine. After neutralization of the chlorine, it reacts with water until chlorine gas has been obtained. The chlorine gas is pumped off, with the water vapor which has also been produced being conveyed through a cooler, in which the water vapor condenses and drains into special basins. The cleansed chlorine gas is conveyed into a condenser, in which the temperature is −50° C. After cooling the chlorine gas is compressed and stored in liquid form in special halogen vessels 41. One can obtaining 217 mols chlorine gas per cubic meter of water, which corresponds to a mass of 15.2 kg.

Figure 2:
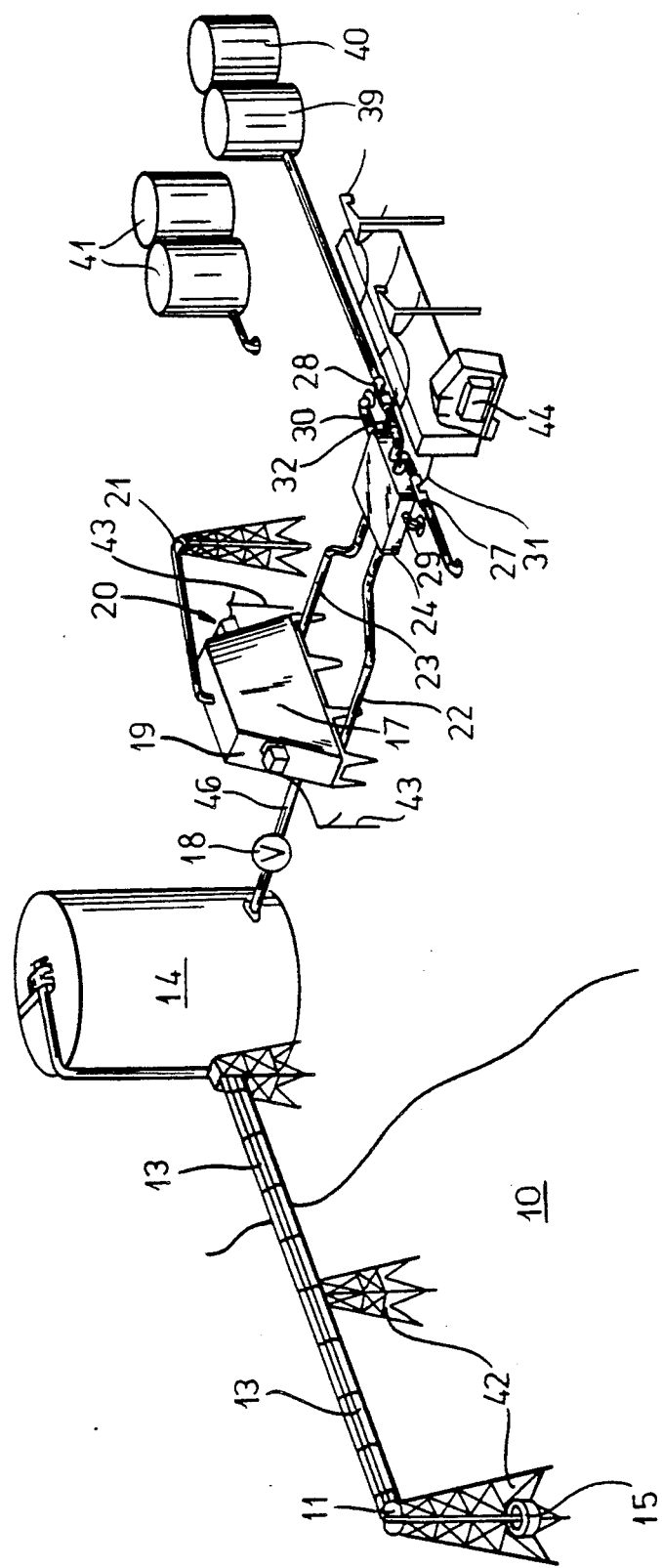
FIG. 2 is a view in perspective of this plant for the desalination of sea water and obtaining of energy on an industrial scale.

FIG. 2 also shows further stands 42 and power supply means 43 for the electrodes 19, 20 and control units 44 for the current obtained.

What we claim is:

1. A process for desalination of seawater, for obtaining energy from seawater and for recovery of raw materials contained in seawater, comprising the steps of:
   (a) drawing seawater from below into a chamber fitted with essentially vertical planar electrodes coated with a dielectric so that ions are deflected toward said electrodes by an electrostatic field between said electrodes;
   (b) passing said seawater through said electrostatic field so that said electrostatic field lies transverse to a direction of flow of said seawater through said electrostatic field and said ions are entrained by said flow;
   (c) collecting seawater streams enriched in anions and cations of said ions deflected toward said electrodes and entrained in said flow of seawater through said electrostatic field, thereby forming aqueous ion flows;
   (a) recovering a low-ion seawater current from the seawater flow through said electrostatic field; and
   (e) conveying said aqueous ion flows past conductors to discharge said aqueous ion flows electrically and pass said aqueous ion flows into a separation stage.

2. The process defined in claim 1 wherein said electrostatic field is generated by applying a direct current voltage between 200 and 500 kV across said electrodes.

3. The process defined in claim 1 wherein said electrostatic field is generated by applying a square wave voltage across said electrodes of between 5 and 20 kV and a frequency between 10 Hz and 2 kHz.

4. The process defined in claim 1 wherein said electrostatic field is produced by applying a continuous direct current voltage across said electrodes and interrupting said direct current voltage for periods less than 20 microseconds by applying an opposite voltage of a same magnitude to said electrodes.

5. The process defined in claim 1 wherein said electrostatic field is produced by applying direct current square polarity between said pulses of a duration of a maximum of 20 microseconds or up to 1/20 of a square wave pulse duration.

6. The process defined in claim 1 wherein said anions and cations are drawn off in step (c) in separate grounded lines.

7. The process defined in claim 6 wherein grounding is interrupted on a partition between said lines and said lines run parallel to one another, separated by a distance such that ions in said lines approach each other by coulomb attraction and said low-ion water is deionized water drawn off by a line bifurcation so that only water containing ions at a high concentration is conveyed to said conductors.

8. The process defined in claim 1 wherein said low-ion water is substantially deionized water making up to 20% of said flow of seawater.

9. The process defined in claim 8, further comprising effecting a second stage separation of deionized water at which 95-97% of a flow is drawn off as deionized water.

10. The process defined in claim 1 wherein said aqueous ion flows have flow velocities between 3 and 7 m/sec.

11. The process defined in claim 1 wherein seawater is pumped into a storage vessel and is caused to flow into and through said chamber solely by potential energy imparted to the seawater by pumping it into said storage vessel.

12. The process defined in claim 1 wherein seawater from a first stage constituted of steps (a) to (d) is caused to pass into a second stage effecting further ion separation therefrom, said process further comprising the step on reducing a flow speed in said second stage by increasing a flow cross section to reduce the flow speed to 40 to 60% of the speed upstream of a location at which flow cross section is increased.

13. The process defined in claim 1, further comprising the step of cleaning said seawater prior to step (a) by removing solids, organic living matter, plants and colloids therefrom.

14. The process defined in claim 1 wherein neutral metals resulting from the discharge of said aqueous ion flows are conveyed in aqueous solution to a reaction vessel, said process further comprising the step of drawing off liquid hydrogen from said reaction vessel.

15. The process defined in claim 14, further comprising the step of purifying the hydrogen in a condenser.

16. The process defined in claim 14, further comprising the step of reacting the neutral metals with water to generate heat, and recovering said heat.

17. The process defined in claim 14 wherein lyes are produced in said reaction vessel and are separated as fractions of different weight.

18. The process defined in claim 14 wherein alkaline earth metals are recovered by heating of respective bases to metal oxides and then by a supply of hydrogen and removal of water, reduced to the elemental alkaline earth metals.

19. The process defined in claim 18 wherein the alkaline earth metals are separated from other metals by stepwise heating at a temperature above a respective melting point.

20. The process defined in claim 1, further comprising the step of neutralizing chlorine in one of said aqueous ion flows and withdrawing chlorine gas.

21. The process defined in claim 20, further comprising the step of conveying said chlorine gas to a cooler and then to water purification.

22. The process defined in claim 22, further comprising the step of cooling chlorine gas in a condenser to $-50°$ C. and then compressing the cooled chlorine gas.

23. A process for desalination of seawater, for obtaining energy from seawater and for recovery of raw materials contained in seawater, comprising the steps of:
   (a) passing seawater through an electric field lying transverse to a direction of flow of the seawater;
   (b) generating said electric field by a square wave voltage;
   (c) collecting seawater streams enriched in anions and cations, thereby forming aqueous ion flows; and
   (d) conveying said aqueous ion flows past conductors to discharge said aqueous ions flows electrically and pass said aqueous ion flows into a separation stage.

24. The process defined in claim 23 wherein said square wave voltage is between 5 and 20 kV and of a frequency of 10 Hz to 2 kHz.

25. The process defined in claim 24 wherein said frequency is 10 to 30 Hz.

26. The process defined in claim 24 wherein said frequency is 5 to 8 kHz.

27. The process defined in claim 23 wherein said square wave voltage is in the form of direct current square wave pulses separated by reversed polarity pulses of a maximum duration of 20 microseconds or up to 1/20 of a square wave pulse duration.

28. The process defined in claim 23 wherein the seawater is pumped prior to step (a) into a storage vessel and flow through a field is maintained solely by potential energy obtained by pumping of seawater into said storage vessel.

29. The process defined in claim 23 wherein alkaline earth metal bases are recovered from said aqueous ion flows, further comprising the steps of transforming said bases into respective oxides and reducing said oxides to the elemental alkaline earth metals.

30. The process defined in claim 23, further comprising the step of recovering gaseous chlorine from said aqueous ion flows and purifying said chlorine.

31. The process defined in claim 23, further comprising the step of recovering liquid hydrogen from said aqueous ion flows.

* * * * *

UNITED STATES PATENT AND TRADEMARK OFFICE
CERTIFICATE OF CORRECTION

PATENT NO. : 5 124 012
DATED : 23 June 1992
INVENTOR(S) : Grigori Isayewiz BERLEYEV It is certified that error appears in the above-identified patent and that said Letters Patent is hereby corrected as shown below:

TITLE PAGE:

[54] Title should read:
--PROCESS FOR THE DESALINATION OF SEA WATER
   AND FOR OBTAINING ENERGY AND THE
   RAW MATERIALS CONTAINED IN SEA WATER--;

[75] Inventor should read:
   --Grigori Isayewiz BERLEYEV, --Benyi Brack, Israel--.
   Berlin, Germany--;

[73] Assignee should read:
   --DOMBAJ GmbH, Berlin, Germany--.

(22) Filed should read -- June 1, 1990, (under 37 CFR 1.47)--.

Signed and Sealed this

Nineteenth Day of October, 1993

Attest:

BRUCE LEHMAN

Attesting Officer        Commissioner of Patents and Trademarks